United States Patent
Baumberg

(10) Patent No.: US 10,672,181 B2
(45) Date of Patent: Jun. 2, 2020

(54) 3D CAPTURE: OBJECT EXTRACTION

(71) Applicant: ULSee Inc., Taipei (TW)

(72) Inventor: Adam Michael Baumberg, Guildford (GB)

(73) Assignee: ULSee Inc., Taipei (TW)

( * ) Notice: Subject to any disclaimer, the term of this patent is extended or adjusted under 35 U.S.C. 154(b) by 345 days.

(21) Appl. No.: 15/722,371

(22) Filed: Oct. 2, 2017

(65) Prior Publication Data

US 2018/0096521 A1 Apr. 5, 2018

(30) Foreign Application Priority Data

Oct. 3, 2016 (GB) .................... 1616773.6

(51) Int. Cl.
*G06T 15/20* (2011.01)
*G06T 7/571* (2017.01)
*G06T 7/33* (2017.01)
*G06T 17/00* (2006.01)

(52) U.S. Cl.
CPC ............ *G06T 15/205* (2013.01); *G06T 7/344* (2017.01); *G06T 7/571* (2017.01); *G06T 17/00* (2013.01); *G06T 2200/04* (2013.01); *G06T 2200/08* (2013.01); *G06T 2207/30244* (2013.01); *G06T 2210/12* (2013.01); *G06T 2210/56* (2013.01)

(58) Field of Classification Search
None
See application file for complete search history.

(56) References Cited

U.S. PATENT DOCUMENTS

| 2009/0052796 | A1 | 2/2009 | Furukawa et al. |
| 2013/0286161 | A1 | 10/2013 | Lv et al. |
| 2014/0270480 | A1* | 9/2014 | Boardman ............... G06T 17/00 382/154 |
| 2015/0269785 | A1* | 9/2015 | Bell ....................... G06T 19/003 345/427 |
| 2016/0071318 | A1 | 3/2016 | Lee et al. |
| 2017/0085733 | A1 | 3/2017 | Ilic et al. |

* cited by examiner

*Primary Examiner* — David Perlman
(74) *Attorney, Agent, or Firm* — Alan D. Kamrath; Mayer & Williams PC

(57) ABSTRACT

Previously our 3DSOM software has solved the problem of extracting the object of interest from the scene by allowing the user to cut-out the object shape in several photographs. This is known as manual "masking". However, we wish to avoid this step to make the system as easy to use as possible. For an unskilled user the process needs to be as simple to use as possible. We propose a method of extracting a complete closed model of an object without the user being required to do anything other than capture the shots.

17 Claims, 6 Drawing Sheets

3D CAPTURE: OBJECT EXTRACTION

FIELD OF THE DISCLOSURE

This invention relates to a method of capturing a 3D model of an object on a surface wherein the surface does not form part of the 3D model, where the capture of 3D model is based on the restriction to a region of 3D space defined solely by the orientation of the camera which takes the photographs.

BACKGROUND OF THE INVENTION

Imaging devices such as mobile phone cameras or other digital cameras can be used to capture 3D models using the process of photogrammetry—which allows the creation a 3D model from images such as photographs. Using common photogrammetry software the system creates a model of all areas that can be seen in multiple images. This means that the user is required to cut-out parts of the 3D model they are interested or not interested in. In particular the object is usually produced, connected to the ground on which it sits. This causes two problems:
1. Difficulty in navigating around the 3D model of the object: Because of the inclusion of the ground plane or background surfaces, the centre of rotation of the model is often poorly defined and does not coincide with the centre of the object of interest.
2. Merging of ground and object surfaces: Usually images are taken from a slight angle so that the photogrammetry process is unable to accurately determine the shape near the bottom of the object. The result is that the ground plane and bottom of the object are "merged" together.

Previously the Applicant's 3DSOM software has solved the problem of extracting the object of interest from the scene by allowing the user to cut-out the object shape in several photographs. This is known as manual "masking". However, such masking requires user effort, skill and time.

Current approaches to extract the object of interest from the scene include:
  Manual masking of object (3DSOM Pro)—requires user effort and skill.
  Agisoft "PhotoScan", Capturing Reality "Reality Capture": User must manually define a bounding box around an initial sparse estimate of the model—requires the user to be running complex photogrammetry software to calculate and then view an initial "sparse" model. The user then must define the orientation position, and dimensions of the bounding box via a complex GUI. Once defined the box may still contain part of the ground plane underneath the object.
  Autodesk ReMake: A model is created and manual tools are provided for cutting out the object in 3D space. A fairly complex GUI is needed, running on a desktop PC.

There is therefore a need to create a simple easy to use system to extract a complete closed 3D model of an object which can be utilized by an unskilled worker without any further input from the user other than capturing the initial images.

SUMMARY OF THE INVENTION

According to a first aspect of the present invention there is provided a method for capturing a 3D model of an object on a surface or environment in a world comprising the steps of:
a) capturing a plurality of images of the object with an imaging device;
b) recovering the imaging device positions and orientations for each of the images;
c) estimating the orientation of the up axis of the world;
d) estimating a bounding region of the object using the positions and orientations of the imaging device and the up axis of the world;
e) building a 3D representation of the object restricted to the bounding region.

Preferably the surface or environment does not form part of the 3D model. Preferably the recovered imaging device positions and orientations for each of the images are used to create a sparse point cloud representing the object on the surface.

Preferably the bounding region is taken around the sparse point cloud of the object aligned with the up axis of the world.

Preferably the up axis of the world is estimated by determining dominant image plane axis from recovered imaging device parameters of each of the images of the object.

Preferably the dominant image plane axis is taken from the mean or summed x or y image plane direction with the maximum magnitude.

Preferably the up axis of world is taken from the mean image plane in the x or y direction with the maximum magnitude.

Preferably the method further comprises estimating points that lie on the ground plane of the world.

Preferably the method further comprises clipping the 3D model above the ground plane to generate a complete 3D model of the object.

Preferably the ground plane is estimated by selecting points with normal close to the up axis of the world this subset is analyzed to find dominant plane.

Preferably the selected points are within 25 degrees.

Preferably the plane selection is biased to lower Z coordinates, where the z axis is aligned to estimate the up axis of the world.

Preferably imaging device positions and orientations are used in directions orthogonal to the estimated up axis to define the bounding region on an object in those directions.

Preferably the recovered surface data is clipped prior to interpolation of 3D model to avoid "merging" or "mixing" of ground and object surfaces.

Preferably the 3D model is automatically orientated based on a specific image.

Preferably the 3D model of the object sits on the ground facing the viewing direction of the first image.

Preferably the imaging device is a mobile phone camera.

Preferably the images of the object are taken on the mobile device camera and the capture of the 3D model of the object takes place on the mobile device or on a server on the "cloud".

These and other objectives of the present disclosure will no doubt become obvious to those of ordinary skill in the art after reading the following detailed description of the preferred embodiment that is illustrated in the various figures and drawings.

DESCRIPTION OF THE PREFERRED EMBODIMENTS

Certain terms are used throughout the following descriptions and claims to refer to particular system components. As one skilled in the art will appreciate, manufacturers may refer to a component by different names. This document does not intend to distinguish between components that differ in name but not differ in functionality. In the following discussion and in the claims, the terms "include", "including", "comprise", and "comprising" are used in an open-ended fashion, and thus should be interpreted to mean "including, but not limited to . . . " The terms "couple" and "coupled" are intended to mean either an indirect or a direct electrical connection. Thus, if a first device couples to a second device, that connection may be through a direct electrical connection, or through an indirect electrical connection via other devices and connections.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

The basic principal of the present invention is to utilize a simple photography workflow to define the object of interest. The workflow is:

Place object on a flat surface (table or floor);

Walk around the object capturing images of the object from a variety of angles—wherein the majority of images should be taken with same imaging device orientation (i.e. landscape or portrait).

Figure 1:
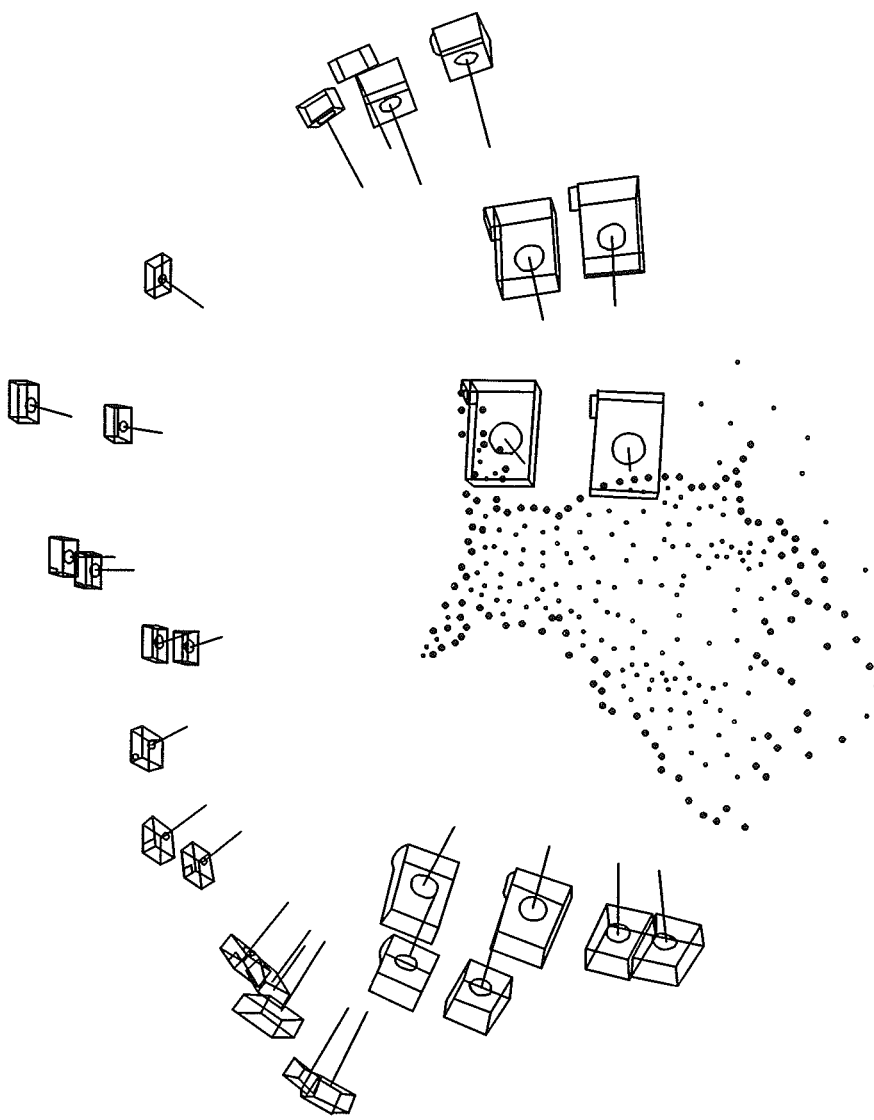
FIG. 1 illustrates a representation of each of the imaging device angles and positions and sparse point cloud representing surfaces captures in the world.

Using this workflow a photogrammetry approach is then used to recover the imaging device rotation angles and positions and generate a sparse point cloud representing surfaces in the world, as is illustrated in FIG. 1.

Standard methods can be used to recover the imaging device data and generate the sparse point cloud.

Recovery of feature points and matching—this can be achieved using a standard method known as SIFT which is described in U.S. Pat. No. 6,711,293 (Lowe). This is a method for identifying scale invariant features in an image and a further method for using such scale invariant features to locate an object in an image. The method for identifying scale invariant features producing a plurality of component subregion descriptors for each subregion of a pixel region about pixel amplitude extrema in a plurality of different images produced from the image. This includes producing a plurality of different images by blurring an initial image to produce a blurred image and by subtracting the blurred image from the initial image to produce the different image. For each different image, pixel amplitude extrema are located and a corresponding pixel region is defined about each pixel amplitude extremum. Each pixel region is divided into subregions and a plurality of component subregion descriptors are produced for each subregion. These component subregion descriptors are correlated with component subregion descriptors of an image under consideration and an object is indicated as being detected when a sufficient number of component subregion descriptors (scale invariant features) define an aggregate correlation exceeding a threshold correlation with component subregion descriptors (scale invariant features) associated with the object.

Recovery of camera positions and orientations—this can be done using standard techniques set out in the literature and in particular with reference to Chapter 13 "Structure from Motion" (Professor Roberto Cipolla, Department of Engineering, University of Cambridge) (http://mi.eng.cam.ac.uk/~cipolla/publications/contributionToEditedBook/2008-SFM-chapters.pdf).

Figure 2:
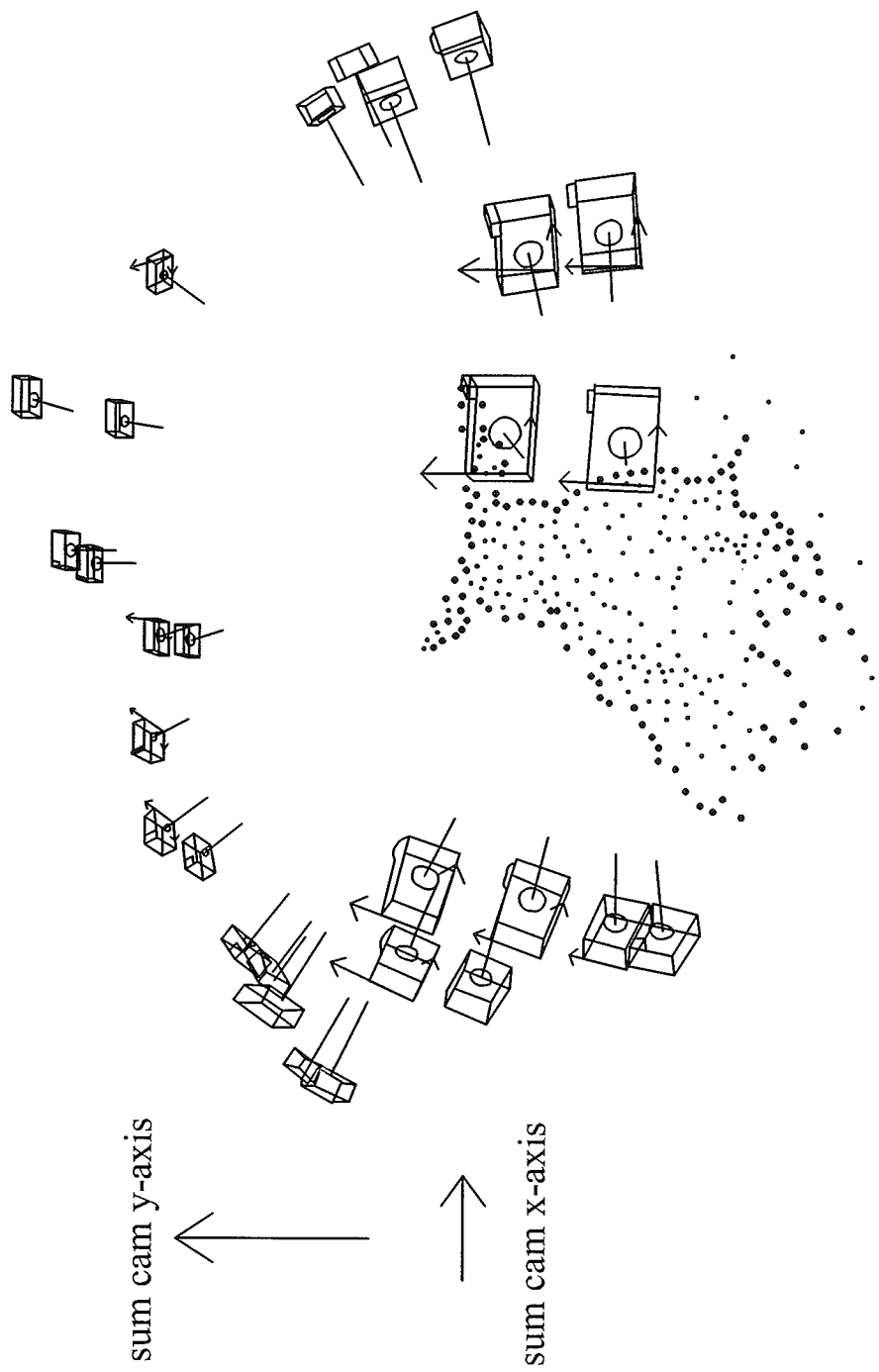
FIG. 2 illustrates a representation of the X and Y image plane directions for each of the imaging devices.

The following steps are then used to extract the 3D model of the object without background elements:

1. Estimate the rough orientation of the world "up" axis. It is assumed that the user holds the imaging device in one of two orientations in the majority of images. The recovered world "x" and "y" image plane directions for all imaging device positions are added up and the dominant direction (maximum magnitude) will tend to align with the world "up" axis. This is illustrated in FIG. 2.

Figure 3:
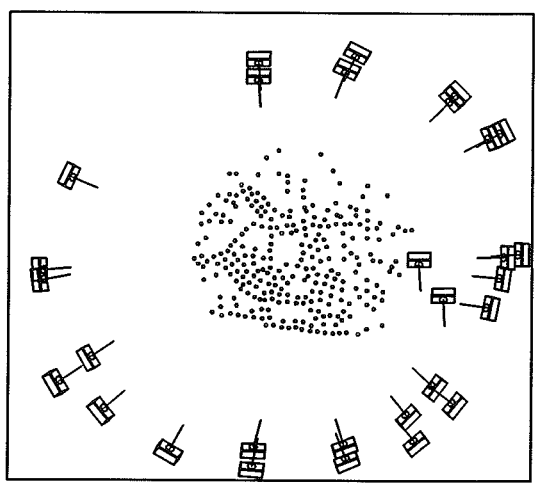
FIG. 3 illustrates the application of a bounding volume to the world.
Figure 3:
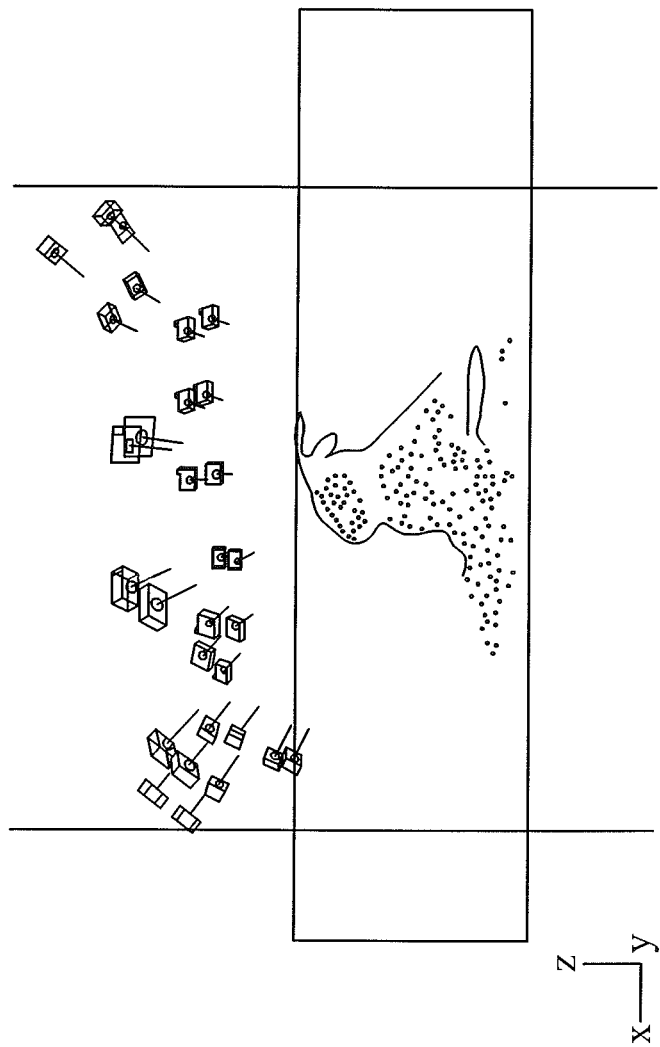

2. Align a bounding volume with the world up axis that contains all the sparse points to get an initial bound on object shape (Box 1 of FIG. 3). If the z direction is aligned with the "up" direction, the bounding box is clipped in the x and y dimensions so that they lie within the bounds of the imaging device positions in the x and y dimensions (Box 2 of FIG. 3). This is illustrated in FIG. 3. In an alternative, instead of a square or rectangular box, it is possible to fit a circle to the imaging device centers in the x and y dimensions to obtain a tighter bound on object location in the x and y dimensions, this is known as a cylinder constraint.

Figure 4:
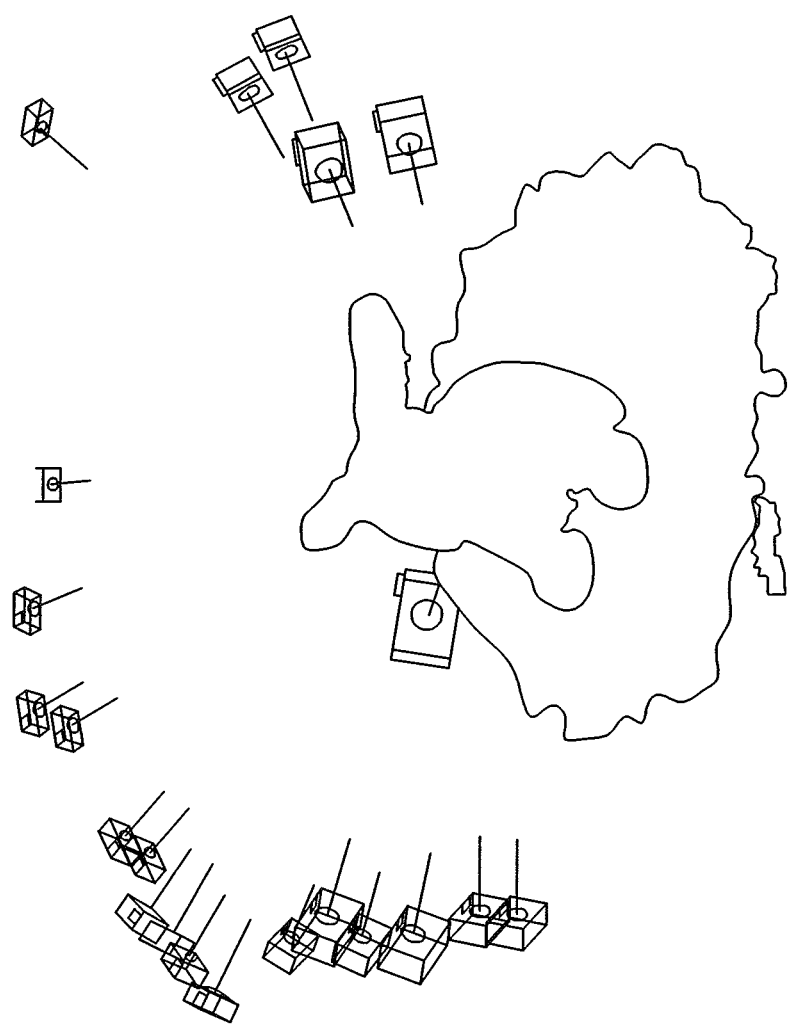
FIG. 4 illustrates a 3D representation created of the bounded volume of the world which includes the object and the ground.
Figure 5:
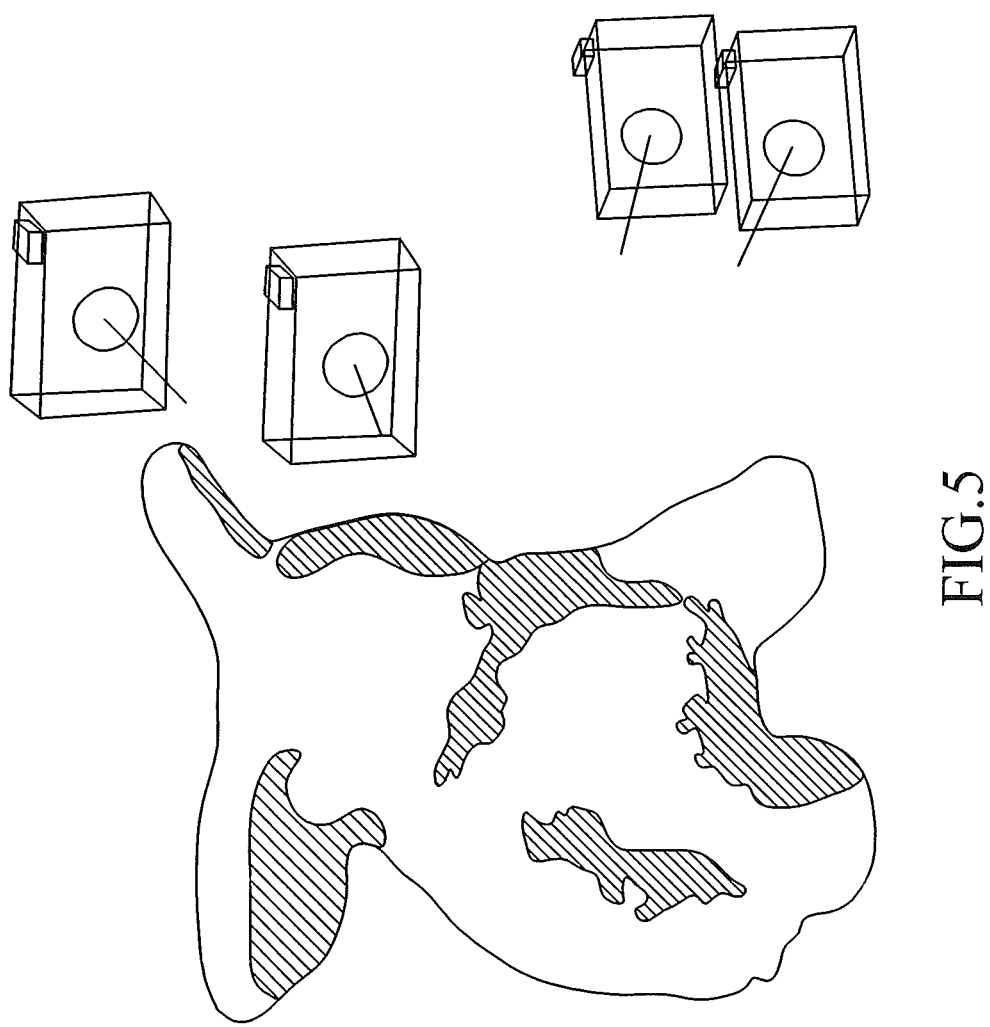
FIG. 5 illustrates the clipped 3D mesh of only the object where the ground has been clipped from the world.

3. Build a 3D representation of the object (points, voxels or polygons) using photogrammetry techniques. This is illustrated in FIG. 4. In this case pairs of imaging devices are processed that are located close together and have similar viewing directions. A stereo pixel-wise matching and triangulation process returns 3D points. Belief Propagation is a standard method of stereo matching that can be used to achieve this. This method is described in the literature in "Belief Propagation on the GPU for Stereo Vision", (Brunton, Shu, Roth), 3rd Canadian Conference on Computer and Robot Vision 2006 http://people.scs.carleton.ca/~c_shu/pdf/BP-GPU-stereo.pdf. In the case of the present invention points outside the estimated bounding volume (background) are rejected.

4. Estimate points that lie on the ground plane of the world. These will be points whose normal roughly aligns with the world up axis which are located near the "bottom" of the bounding volume. A technique is used wherein three candidate points are randomly selected to construct a "guess" for the ground plane and select the guess that has the most support from the candidate ground plane points. This is an example of Random sample consensus (RANSAC) (see for example https://en.wikipedia.org/wiki/Random_sample_consensus). RANSAC is an iterative method to estimate parameters of a mathematical model from a set of observed data that contains outliers, when outliers are to be accorded no influence on the values of the estimates.

Therefore, it also can be interpreted as an outlier detection method. It is a non-deterministic algorithm in the sense that it produces a reasonable result only with a certain probability, with this probability increasing as more iterations are allowed. The algorithm was first published by Fischler and Belles at SRI International in 1981. They used RANSAC to solve the Location Determination Problem (LDP), where the goal is to determine the points in the space that project onto an image into a set of landmarks with known locations.

In the case of the present invention from three points p0, p1, p2 directions p1-p0, p2-p0 are calculated which lie along plane. The cross product is normal to the plane and p0 lies on the plane. The distance to the plane is then calculated for all points and the number of points are counted within a small threshold. This gives an integer value for the "support" for each plane. In the case of the present invention it is preferred that 1000 random planes are initially selected and that the plane is chosen that has the maximum "support" value.

Once the ground plane has been estimated, the 3D model is clipped just above the ground to ensure that a complete model of the object is recovered without any extraneous surfaces.

In the present invention, a set of representative points are used and the clipped points processed using standard methods to create a closed mesh. Note that meshing requires interpolation of the point data and by clipping the ground points prior to meshing, the ground points are therefore avoided from affecting the interpolated mesh near the ground (hence avoids the problem of "merging" of ground and object). In the case of the present invention the clipped points are processed to produce a polygonal model using a standard method called "Poisson surface reconstruction" (Kazhdan, Bolitho, Hoppe) Eurographics Symposium on Geometry Processing (2006) http://hhoppe.com/poissonrecon.pdf.

The final mesh can be clipped again in case the interpolation scheme re-creates parts of the object under the known ground plane position.

The object can be orientated as follows. The coordinate system is defined with the world up direction estimated as above and the world x axis defined by selecting the x-axis image plane for the first camera (or one specified by the user) and orthogonalizing with respect to the estimated world "up". The final axis is the cross product of these two directions. The resulting coordinates system ensures there is a "natural" default orientation for viewing the model so that it is sitting on the ground and facing the first imaging device location.

Worked Example to Determine "Up" in the World

In this worked example, we have assume that 6 images have been taken, and as such there are 6 imaging device locations, each corresponding to one of the 6 images. The positions of the imaging devices and co-ordinates on the x-y plane of the images that have been taken are set out below.
  camera index: 0
  position: 4.35, 5.96, 3.41
  image plane x-axis: 0.76, −0.53, 0.38
  image plane y-axis: −0.37, 0.13, 0.92
  camera index: 1
  position: −7.76, 6.31, 3.74
  image plane x-axis: 0.91, 0.33, −0.24
  image plane y-axis: 0.26, −0.01, 0.97
  camera index: 2
  position: −9.65, −6.09, 16.38
  image plane x-axis: −0.83, 0.48, −0.28
  image plane y-axis: 0.45, 0.88, 0.1
  camera index: 3
  position: 0.57, −8.98, 15.42
  image plane x-axis: −0.92, −0.28, 0.29
  image plane y-axis: −0.21, 0.94, 0.26
  camera index: 4
  position: 8.54, −2.42, 8.18
  image plane x-axis: −0.06, −0.81, 0.58
  image plane y-axis: −0.52, 0.52, 0.67
  camera index: 5
  position: 5.42, 2.95, 0.39
  image plane x-axis: 0.65, −0.64, 0.40
  image plane y-axis: −0.26, 0.31, 0.92

The values of all of the x-axes and all of the y-axes are then added up:
  sum x-axes: 0.52, −1.46, 1.13
  sum y-axes: −0.65, 2.76, 3.90

Figure 6:
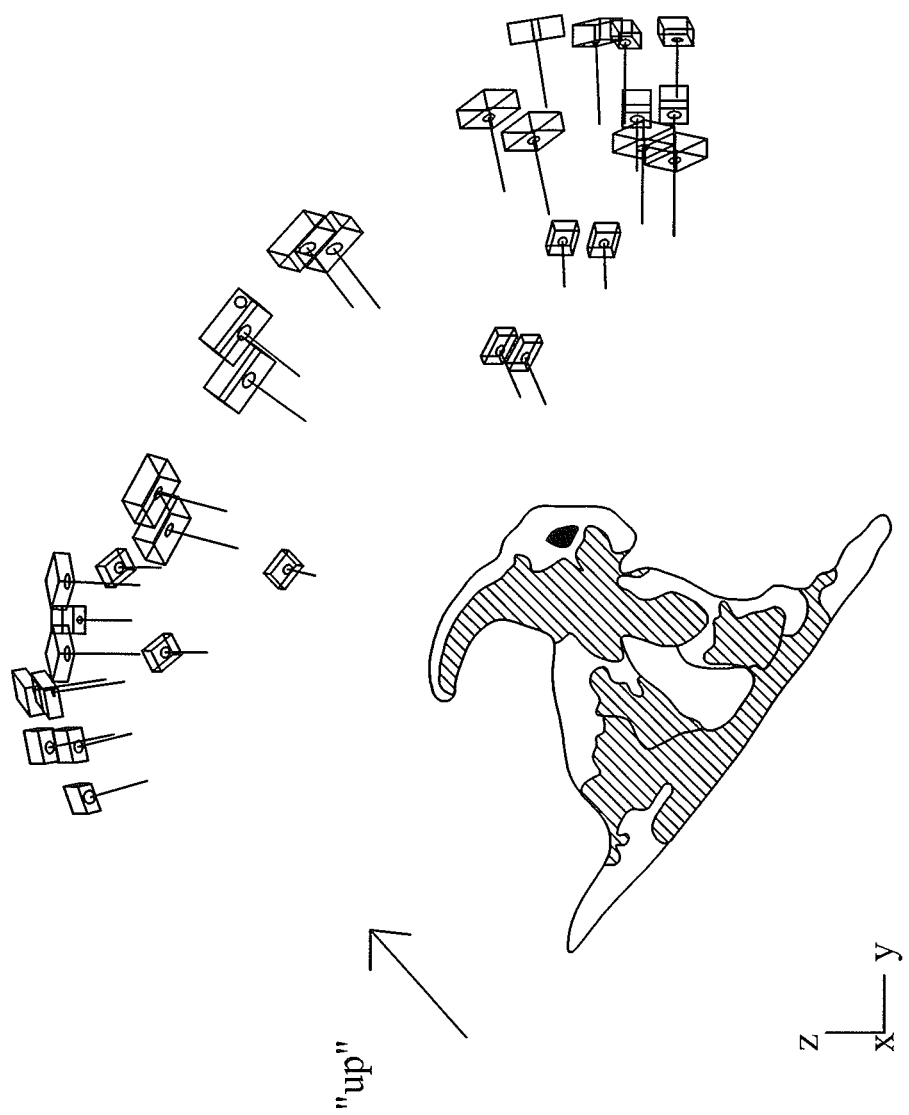
FIG. 6 illustrates the initial solved imaging device data before resetting world "up" direction.

In this case therefore, the maximum magnitude sum axes is the sum of the y-axes and the direction "up" is the normalized sum of the y-axes: −0.14, 0.57, 0.81. This can be seen in FIG. 6 which shows the initial solved camera data before resetting world "up".

The above are only preferred examples of the present disclosure is not intended to limit the present disclosure within the spirit and principles of the present disclosure, any changes made, equivalent replacement, or improvement in the protection of the present disclosure should contain within the range.

Those skilled in the art will readily observe that numerous modifications and alterations of the device and method may be made while retaining the teachings of the invention. Accordingly, the above disclosure should be construed as limited only by the meters and bounds of the appended claims.

What is claimed is:

1. A method for capturing a 3D model of an object on a surface or environment in a world comprising the steps of: a) capturing a plurality of images of the object with an imaging device; b) recovering the imaging device positions and orientations for each of the images; c) estimating the orientation of the up axis of the world; d) estimating a bounding region of the object using the positions and orientations of the imaging device and the up axis of the world; and e) building a 3D representation of the object restricted to the bounding region;
    wherein the up axis of the world is estimated by determining dominant image plane axis from recovered imaging device parameters of each of the images of the object.

2. The method as claimed in claim 1, wherein the surface or environment does not form part of the 3D model.

3. The method as claimed in claim 1, wherein the recovered imaging device positions and orientations for each of the images are used to create a sparse point cloud representing the object on the surface.

4. The method as claimed in claim 3, wherein the bounding region is taken around the sparse point cloud of the object aligned with the up axis of the world.

5. The method as claimed in claim 1, wherein the up axis for the world is taken from the mean image plane in the x or y direction with the maximum magnitude.

6. The method as claimed in claim 1, further comprising estimating points that lie on the ground plane of the world.

7. The method as claimed in claim 6, further comprising clipping the 3D model above the ground plane to generate a complete 3D model of the object.

8. The method as claimed in claim 6, wherein the ground plane is estimated by selecting points with normal close to the up axis of the world this subset is analyzed to find dominant plane.

9. The method as claimed in claim 8, wherein the selected points are within 25 degrees.

10. The method as claimed in claim 8, wherein the plane selection is biased to lower Z coordinates, where the z axis is aligned to estimate the up axis of the world.

11. The method as claimed in claim 1, wherein imaging device positions and orientations are used in directions orthogonal to the estimated up axis to define the bounding region on an object in those directions.

12. The method as claimed in claim 1, wherein the recovered surface data is clipped prior to interpolation of 3D model to avoid "merging" or "mixing" of ground and object surfaces.

13. The method as claimed in claim 1, wherein the 3D model is automatically orientated based on a specific image.

14. The method as claimed in claim 13, wherein the 3D model of the object sits on the ground facing the viewing direction of the first image.

15. The method as claimed in claim 1, wherein the imaging device is a mobile phone camera.

16. The method as claimed in claim 15, wherein the images of the object are taken on the mobile device camera and the capture of the 3D model of the object takes place on the mobile device.

17. The method as claimed in claim 15, wherein the images of the object are taken on the mobile device camera and the capture of the 3D model of the object takes place on a server on the "cloud".

\* \* \* \* \*